(12) United States Patent
Pesz et al.

(10) Patent No.: US 9,791,308 B2
(45) Date of Patent: Oct. 17, 2017

(54) LOW SALT ALERT SYSTEM

(71) Applicant: Hankscraft, Inc., Reedsburg, WI (US)

(72) Inventors: Jeffery Todd Pesz, Reedsburg, WI (US); Randy Hince, Friendship, WI (US); Ronald Pulvermacher, Cottage Grove, WI (US)

(73) Assignee: Hankscraft, Inc., Reedburg, WI (US)

( * ) Notice: Subject to any disclaimer, the term of this patent is extended or adjusted under 35 U.S.C. 154(b) by 0 days.

(21) Appl. No.: 15/082,483

(22) Filed: Mar. 28, 2016

(65) Prior Publication Data
US 2016/0292990 A1 Oct. 6, 2016

Related U.S. Application Data

(60) Provisional application No. 62/140,543, filed on Mar. 31, 2015.

(51) Int. Cl.
| | | |
|---|---|---|
| *G08B 21/18* | (2006.01) | |
| *G01F 23/292* | (2006.01) | |
| *C02F 1/42* | (2006.01) | |
| *G01F 23/00* | (2006.01) | |
| *C02F 1/00* | (2006.01) | |
| *C02F 1/68* | (2006.01) | |

(52) U.S. Cl.
CPC ............ *G01F 23/292* (2013.01); *C02F 1/008* (2013.01); *C02F 1/688* (2013.01); *G01F 23/0007* (2013.01); *G01F 23/2928* (2013.01); *C02F 1/42* (2013.01); *C02F 2209/008* (2013.01); *C02F 2209/05* (2013.01); *C02F 2303/16* (2013.01)

(58) Field of Classification Search
CPC ............... G01F 23/292; G01F 23/0007; G01F 23/2928; C02F 1/008; C02F 1/688; C02F 2209/05; C02F 2209/008; C02F 1/42; C02F 2303/16

USPC ............... 340/500, 540, 606, 612, 617, 619
See application file for complete search history.

(56) References Cited

U.S. PATENT DOCUMENTS

| | | |
|---|---|---|
| 4,987,409 A | 1/1991 | Jackson |
| 5,132,669 A | 7/1992 | Jackson |
| 6,284,132 B1 | 9/2001 | Zimmerman et al. |
| 6,456,202 B2 | 9/2002 | Johannsen et al. |
| 6,696,963 B2 | 2/2004 | Zimmerman et al. |

(Continued)

OTHER PUBLICATIONS

Robot Room, Hard Water Softener Brine Tank Salt Level LED Bar Graph Monitor, Aug. 9, 2013, pp. 1-16.*
Sharp, GP2D12 Optoelectronic Device, 2005, pp. 1-10.*

*Primary Examiner* — Brian Wilson
(74) *Attorney, Agent, or Firm* — Merchant & Gould P.C.

(57) ABSTRACT

A brine tank salt level detection apparatus is disclosed. The apparatus includes a housing secured to a lid of a brine tank, where the housing supports an infrared emitter and an infrared sensor. The apparatus is configured to emit an infrared signal, receive an infrared signal, and determine whether a salt level in the brine tank is below a predetermined level using, at least in part, the receipt of the infrared signal. A method for determining a salt level in a brine tank is also disclosed. The method can include emitting an outgoing infrared signal, receiving an incoming infrared signal, determining whether the salt level is below a predetermined level based at least in part on the receipt of the incoming infrared signal, and when the salt level is below a predetermined level, alerting a user of the low salt level in the brine tank.

19 Claims, 9 Drawing Sheets

(56) References Cited

U.S. PATENT DOCUMENTS

| | | |
|---|---|---|
| 6,696,966 B2 | 2/2004 | Bearak |
| 7,030,768 B2 | 4/2006 | Wanie |
| 7,369,055 B2 | 5/2008 | Wanie |
| 7,818,094 B2 | 10/2010 | Rambicourt et al. |
| RE42,386 E | 5/2011 | Wanie |
| 7,949,747 B1 | 5/2011 | Van Oosterwijck et al. |
| 8,180,489 B2 | 5/2012 | Quinn et al. |
| 8,535,540 B2 | 9/2013 | Chandler, Jr. |
| 8,758,628 B2 | 6/2014 | Quinn |
| 2002/0170354 A1 | 11/2002 | Monsrud et al. |
| 2002/0170861 A1 | 11/2002 | Monsrud et al. |
| 2004/0188330 A1 | 9/2004 | Slawson et al. |
| 2006/0114593 A1* | 6/2006 | Sagaert ............. G01F 23/296 360/72.2 |
| 2008/0047881 A1 | 2/2008 | Buck et al. |
| 2009/0211984 A1 | 8/2009 | Petty |
| 2010/0242593 A1* | 9/2010 | Lagergren ............. G01D 5/48 73/290 V |
| 2012/0078722 A1* | 3/2012 | Van Oosterwijck ...... G06Q 30/0261 705/14.58 |
| 2012/0112919 A1* | 5/2012 | Witter ............. G01J 1/0271 340/612 |
| 2012/0312750 A1 | 12/2012 | Chandler, Jr. |
| 2012/0312756 A1 | 12/2012 | Chandler, Jr. |
| 2013/0298468 A1 | 11/2013 | Gasparetto |
| 2014/0013839 A1 | 1/2014 | Chandler, Jr. |

* cited by examiner

LOW SALT ALERT SYSTEM

INTRODUCTION

Some water softening systems include a brine tank in fluid communication with a mineral tank. The mineral tank typically includes an ion-exchange resin that requires periodic regeneration. The resin is regenerated with a brine solution containing a salt, such as NaCl, whereby the $Na^+$ and $Cl^-$ ions replace mineral ions in the resin, such as $Ca^{2+}$ and $CO_3^{2-}$. Other media can also be used, such as potassium chloride.

The brine solution is produced in the brine tank typically by the dissolution of salt pellets stored therein. Because the salt pellets dissolve, a user must periodically add salt to the brine tank. If the amount of salt pellets in the brine tank falls below a particular level, the water softening unit will not function properly and could even be damaged, requiring expensive servicing, replacement of the entire system and/or and damage to the pipes and water-using appliances in the building.

SUMMARY

In one aspect, a brine tank salt level detection apparatus includes an infrared emitter, an infrared sensor, a housing supporting the infrared emitter and the infrared sensor, where the housing is configured to be secured to a lid of a brine tank; at least one processor in communication with the infrared emitter and the infrared sensor; and a memory device in communication with the processor, where the memory device stores instructions that, when executed by the processor, cause the apparatus to: emit an infrared signal, receive a reflected infrared signal; and determine whether a salt level in the brine tank is below a predetermined level based at least in part on the receipt of the reflected infrared signal.

The infrared emitter can be an infrared light emitting diode that is configured to emit an infrared signal every about 24 hours. The longitudinal axis of the infrared emitter can be aligned substantially normal to the brine tank lid. The housing can also include a mounting cylinder and a nut that secures the housing to the brine tank lid. The apparatus can also include a wireless communication module in electrical communication with the processor and the memory device, where the wireless communication module is configured to transmit a low salt level alert received from the processor. A notification LED can be configured to be illuminated when the processor determines that the salt level is below the predetermined level. The predetermined level can be anywhere from about 20 inches from the top of the tank to about 34 inches from the top of the tank. The processor can determine the salt level in the brine tank at least in part based on whether the infrared sensor detected one or more reflected infrared signals.

In another aspect, a method for determining a salt level in a brine tank is disclosed. The method includes emitting an outgoing infrared signal, receiving an incoming infrared signal, determining whether the salt level is below a predetermined level based at least in part on the receipt of the incoming infrared signal, and when the salt level is below a predetermined level, alerting a user of the low salt level in the brine tank.

The method can additionally include illuminating a notification light emitting diode when the salt level is below the predetermined level. The incoming infrared signal can be a reflection from the salt in the brine tank. Determining whether the salt level is below the predetermined level can include determining whether an infrared sensor detected one or more reflected infrared signals. Also, determining whether the salt level is below the predetermined level can also include receiving an indication of a brine tank size and, when the infrared emitter emits the outgoing infrared signal, adjusting a power supplied to the infrared emitter based on the brine tank size. Alerting the user can include transmitting a message via a wireless network. The infrared signal can be emitted about every 24 hours and the message can be transmitted about every 24 hours. Alerting the user can also include illuminating a notification light emitting diode when the salt level is below the predetermined level. The infrared signal can be emitted by an infrared light emitting diode with a longitudinal axis oriented substantially normal to the lid of the brine tank.

In yet another aspect, a system for notifying a user of a low salt level in a brine tank is disclosed. The system can include an infrared light emitting diode, an infrared sensor, a visible light emitting diode, a computing device in communication with the infrared LED, the visible light emitting diode and the infrared sensor, and a housing supporting the infrared LED, the infrared sensor, the visible light emitting diode and the computing device.

The computing device includes a processor, a memory and a wireless module. The memory stores instructions that, when executed by the processor, cause the system to: periodically emit an infrared signal into the brine tank, receive a reflected infrared signal, determine whether a salt level in the brine tank is below a predetermined level based at least in part on the receipt of the reflected infrared signal, transmit a low salt level alert via the wireless module when the salt level in the brine tank is below the predetermined level, and illuminate the visible light emitting diode when the salt level in the brine tank is below the predetermined level.

The low salt alert can be sent to a cloud server and can be sent when the salt level is less than about 20 inches from the top of the tank. A portion of the housing can be sized to pass through a circular cutout in a brine tank lid, where the circular cutout is about 2.5 inch in diameter. The system can also include a brine tank size indicator, where the processor uses an indication of a size of the brine tank to determine whether a salt level in the brine tank is below the predetermined level.

The infrared signal can be emitted every about 24 hours. The infrared light emitting diode can be positioned normal to a base of the brine tank. The visible light emitting diode can be configured to flash when the salt level is below the predetermined level. Also, the processor can determine the salt level in the brine tank at least in part based on whether the infrared sensor detected one or more reflected infrared signals.

DESCRIPTION OF THE FIGURES

The following figures, which form a part of this application, are illustrative of described technology and are not meant to limit the scope of the claims in any manner, which scope shall be based on the claims appended hereto.

DETAILED DESCRIPTION

Water softening units are usually located in a basement, garage, or utility room of a building, or outside of the building, and are sometimes elevated above ground level. Unless the owner of the water softening unit regularly checks the brine tank salt level, they may not know when the salt level becomes low in the brine tank and more salt must be added to the tank. A water softening unit operating without the proper amount of salt risks malfunctioning, permanent damage to the unit's mechanical parts, and damage to the pipes and water-using appliances in the building. Checking the salt level involves removing the brine tank lid and visually observing the salt level. In some regions, the water softening system is elevated off the ground level, which can complicate visual inspection. It is with respect to this general environment that the embodiments of the present application are directed.

Figure 1:
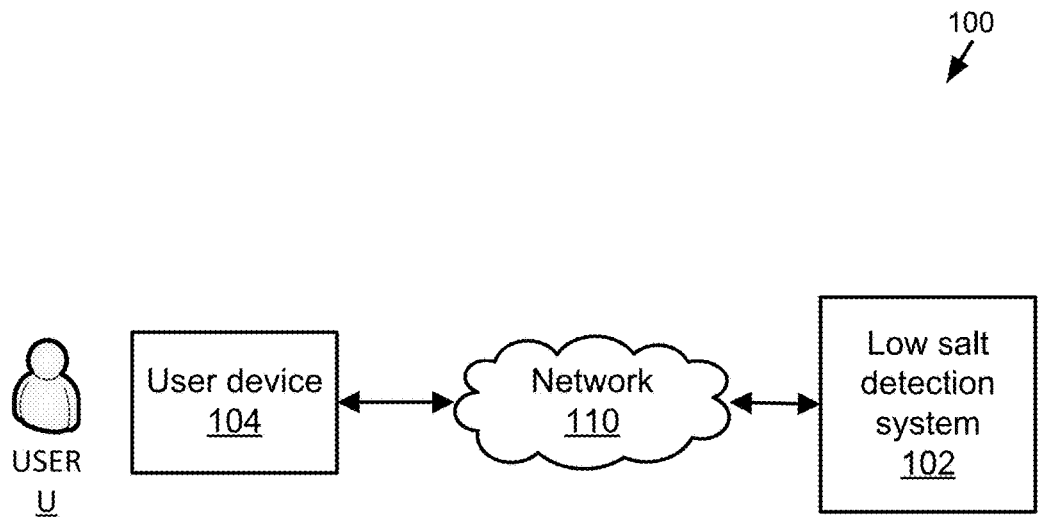
FIG. 1 is a block diagram of an environment for an embodiment of an example low salt detection system.

FIG. 1 is a schematic block diagram illustrating an environment for an example system 100 for alerting a user of a low salt level in a brine tank. The example system includes a user U, an internet-capable user device 104, a network 110, and a low salt detection system 102. Examples of the user U include a homeowner, apartment complex manager, building manager, water conditioning equipment installer or any person who can add salt to the brine tank or communicate a low salt alert to a person such that the salt in the brine tank can be replenished. Other embodiments can include more or fewer components.

In the example system 100, the low salt detection system 102 is in wireless communication with a network 110 over a wireless network. Example wireless networks include Wi-Fi (802.11a/b/g/n), Bluetooth, Bluetooth Low Energy (BLE), Zigbee, Near Field Communication, 6LoWPAN, cellular (e.g. CDMA, GSM, LTE), or other radio frequency communication systems. In the embodiments using Wi-Fi communication, the network includes a wireless router, a wired or wireless modem, or a wireless access point. The wireless communication can occur as signals sent via electromagnetic waves, such as in the form of optical signals or radio frequency (RF) signals. The network 110 can be a combination of more than one type of wireless networks and include the Internet and a Local Area Network.

The low salt detection system 102 can communicate with the network 110 using an "internet of things" protocol. For example, in one embodiment the low salt detection system 102 uses MQ Telemetry Transport (MQTT) protocol. The low salt detection system 102 can be programmed to communicate with the Wi-Fi router located in the home or building. Other protocols supporting one-way or two-way communication between the low salt unit and a server are possible.

When it determines that there is a low salt condition, the low salt detection system 102 is configured to send a message to the network 110 and then the network 110 sends a message to a user device 104. The user U receives the message on the user device 104, which can be a smart phone, tablet computer, smart watch, or other internet-capable computing device. The message can include a unique identifier for the particular tank or user, and a message that the system has detected a low salt condition. Additionally, the message can include an actual salt level as determined by the low salt detection system 102.

The low salt detection system 102 can also include a visual notification component, such as a light-emitting diode (LED), that notifies the user U of a low salt condition in the brine tank. An embodiment of example low salt detection system 102 is shown and described in more detail below with reference to FIG. 2.

The network 110 can include an electronic notification service that is hosted on a server that is connected to the internet and is located away from and in a different physical location than the network 110. The server enables low salt detection unit registration and low salt alert notifications. Additionally, the server can track and record salt usage, low salt alert notifications sent, and current salt level. As mentioned above, the messages can be sent over one or more types of networks.

Figure 2:
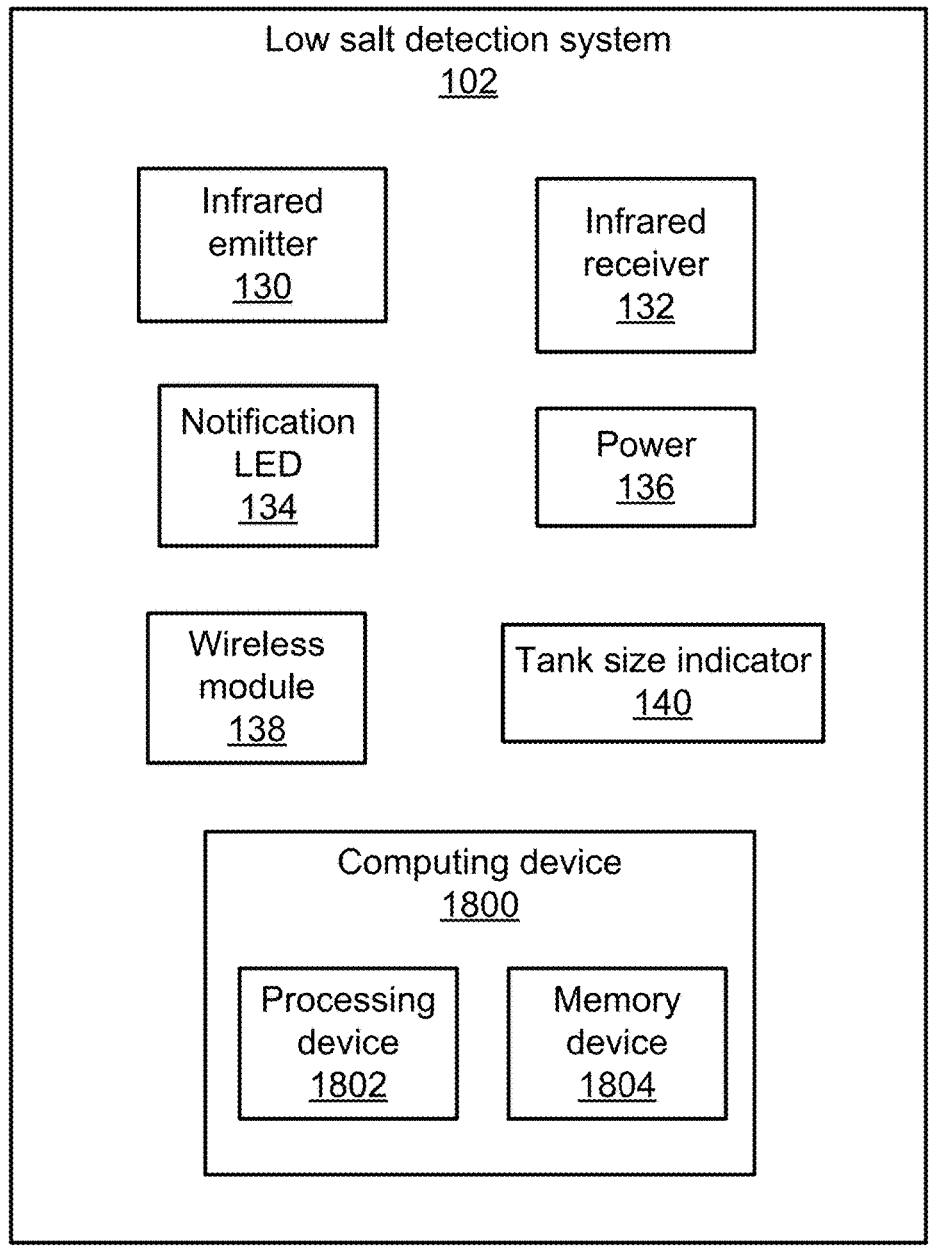
FIG. 2 is a block diagram of an embodiment of an example low salt detection system.

FIG. 2 is an embodiment of an example low salt detection system 102. The example embodiment includes an infrared emitter 130, an infrared receiver 132, one or more notification LEDs 134, power supply 136, computing device 1800, wireless module 138 and optional tank size indicator 140. Each component is in communication, at least, with the computing device 1800. Other embodiments can include more or fewer components. For example, in an alternate embodiment, the low salt detection system 102 does not include the wireless module 138.

The infrared emitter 130 is configured to emit an infrared signal into the brine tank. In the embodiment of the example system 102, the infrared emitter 130 is an infrared LED emitter, sized from about 3 mm to about 5 mm, that emits at a wavelength of about 940 nm. However, other sizes can be used with the system, and any wavelength within the infrared and near-infrared spectrum, from about 700 nm to about 1 mm, can be used. In embodiments, the infrared emitter 130 is an LED with relatively low power output. An example of a commercially available infrared emitter 130 is the IR204/H16/L10 3 mm Infrared LED, T-1 from Everlight Americas Inc. (Carrollton, Tex.). Other types of infrared emitters can be used, such as an infrared transmitter or other light-emitting components.

The infrared receiver 132 is configured to receive an infrared signal. The infrared receiver 132 is an infrared phototransistor in the embodiment of example system 102. The infrared receiver 132 can be, for example, a 2 mm by 2 mm surface mount resistor, or as large as, for example, a 10 mm LED receiver. Examples of commercially available infrared receivers 132 include the EAIRMDA1 Infrared Receiver Module from Everlight Americas Inc. (Carrollton, Tex.) and the TSOP4138 Infrared Receiver Module available from Vishay Semiconductors (Shelton, Conn.). Other types and sizes of infrared sensors can be used.

The one or more notification LEDs 134 include at least one LED for notifying a user of a low salt condition in the brine tank. Each of the one or more notification LEDs 134 may be a multi-die LED. The LED can be configured to flash, blink or display a color, such as red, when the system 102 has detected a low salt condition of the brine tank. In other embodiments, the notification LEDs are any type of visual output component or output panel.

The notification LEDs 134 can also include a wireless network connection status LED. The wireless network connection status LED can be configured to illuminate when the system 102 is connected to the wireless network, to flash when attempting to connect to the wireless network, and to be off when the system 102 is not connected to the wireless network. For example, the wireless configuration LED can flash an amber color when the unit is attempting to connect to a wireless network, and remain on when the unit is connected to a wireless network.

The notification LEDs 134 can also include a power status LED, where the LED is illuminated when the system 102 has power and is off when the system 102 does not have power.

Power supply 136 provides power to the components of the example low salt detection system 102. In one embodiment, the building mains power provides power to the low salt detection system 102. In embodiments, the power supply 136 can include a battery source. The low salt detection system 102 can also be configured to be powered via the water softening system.

In embodiments of example system 102, the computing device 1800 is a preprogrammed microprocessor or a system on chip. The same microprocessor controls the infrared signal emission and infrared signal detection discussed below in more detail.

The computing device 1800 is in communication with the components of the example low salt detection system 102 and includes at least one processing device 1802, such as a central processing unit (CPU). A variety of processing devices are available from a variety of manufacturers, for example, Intel or Advanced Micro Devices. In this example, the computing device 1800 also includes a memory device 1804, and a system bus that couples various system components including the memory device 1804 to the processing device 1802. The system bus is one of any number of types of bus structures including a memory bus or memory controller, a peripheral bus, and a local bus using any of a variety of bus architectures.

In this example, the computing device 1800 also includes a memory device 1804, which includes read only memory and random access memory. A basic input/output system containing the basic routines that act to transfer information within computing device 1800, such as during start up, is typically stored in the read only memory.

In some embodiments, computing device 1800 includes input devices to enable the user to provide inputs to the computing device 1800. Examples of input devices include a touch-sensitive display device, such as an liquid crystal display (LCD) and smart devices, such as smart phones, tablet computers, etc., that can access applications (also called "apps").

The computing device 1800 typically includes at least some form of computer-readable media. Computer readable media includes any available media that can be accessed by the computing device 1800. By way of example, computer-readable media include computer readable storage media and computer readable communication media.

A number of program modules can be stored in a secondary storage device or the memory device 1804, including an operating system, one or more application programs, other program modules, and program data. The data used by the computing device may be stored at any location in the memory 1804, such as the program data, or at the secondary storage device.

The different components of the low salt alert system, such as the intermediary servers that communicate with the smart devices, can also require maintenance in the form of firmware and software updates. These intermediary servers can be managed by the systems and methods described herein to update the maintenance requirements of the servers.

Embodiments of the present invention may be utilized in various distributed computing environments where tasks are performed by remote processing devices that are linked through a communications network in a distributed computing environment.

In other embodiments, the computing device 1800 is an embedded micro-controller or system-on-chip (SOC). In still other embodiments, the low salt detection system 102 uses the processor in the wireless module 138 as the processing device 1802.

The wireless module 138 includes an antenna, connects to the wireless network, and enables communication to, and in some embodiments, from, the network. In some embodiments, the wireless module 138 is a system on a chip (SoC). The wireless module 138 can be mounted onto a circuit board. An example wireless module is the Texas Instruments 3200.

The optional tank size indicator 140 is a slide switch, dip switch or other user-input component. The tank size indicator 140 includes a slide switch enabling a user to select a brine tank size, for example, "3-feet," "3.5-feet" and "4-feet". In other embodiments, only two brine tank sizes are available for user selection, such as "38 inches" and "44 inches." The user selects the brine tank size closest to the actual brine tank size. In an embodiment, the tank size indicator 140 can also be configured to receive the tank dimensions from the user. Other sizes are possible.

In some embodiments, the low salt detection system 102 includes a salt type indicator. For example, a slide switch that the user can toggle to indicate what type of salt is in the brine tank, such as blocks, pellets, etc. The type of salt may affect the reflection and ultimate reception of emissions by the infrared receiver 132.

In the embodiment of example method 200, shown and described below with reference to FIG. 3, the tank size indicator 140 adjusts the timing that the computing device 1800 uses to determine whether there is a low salt condition in the tank. For example, tank size indicator 140 includes three dip switches labeled "3-feet," "3.5-feet" and "4-feet". When the user selects one of those switches that corresponds to the height of their brine tank, the tank size indicator 140 sends a signal to the computing device 1800 to use a particular time for the low salt determination, such as 2 nanoseconds.

In the embodiment of example method 300, shown and described below with reference to FIG. 4, the tank size indicator 140 sends a signal to the computing device 1800 to send a specific amount of current to the infrared emitter 130 based on the indicated tank size. Adjusting the power is described in more detail below with reference to operation 304.

Figure 3:
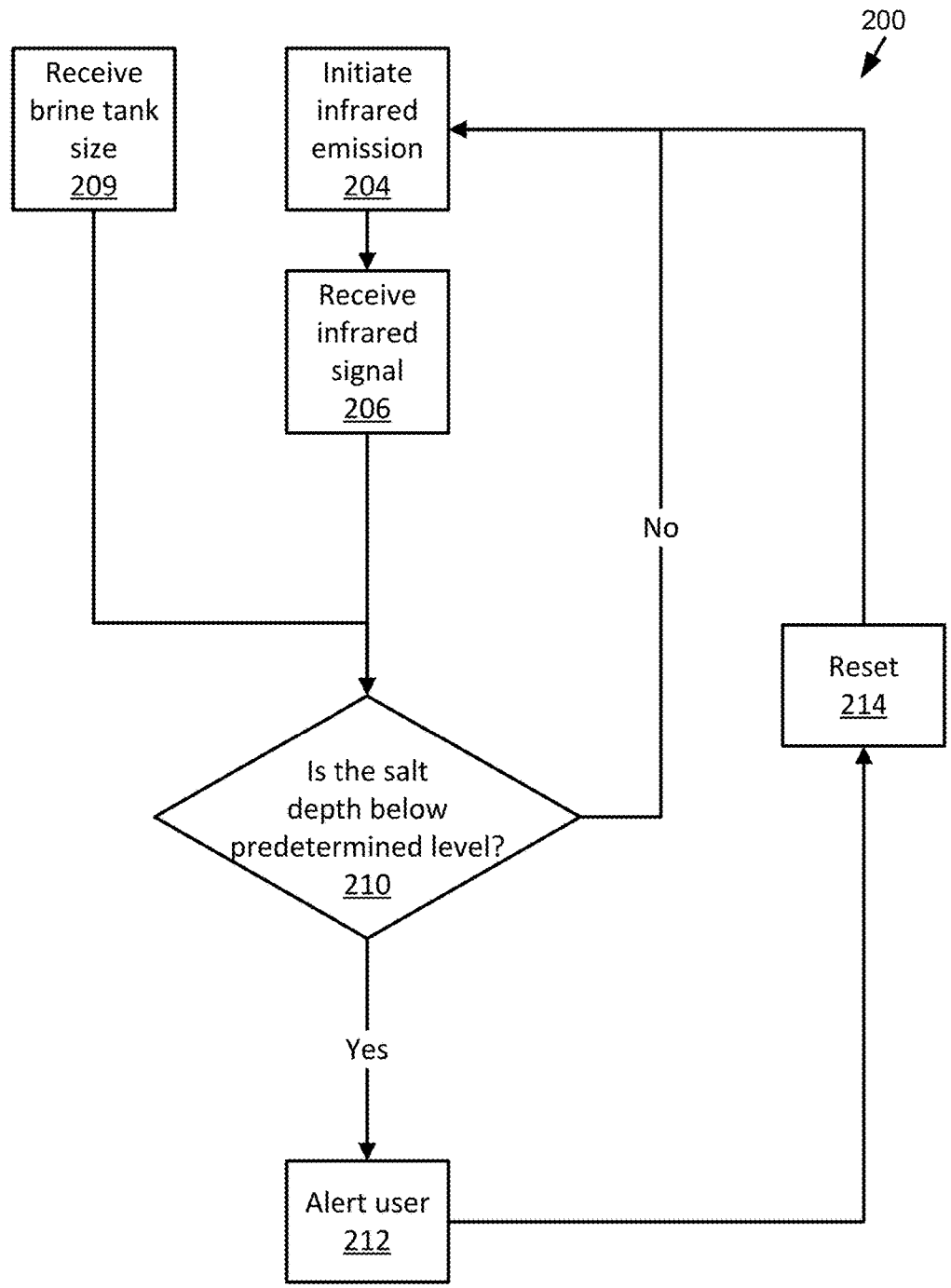
FIG. 3 is an embodiment of an example method for determining whether a salt level in a brine tank is below a predetermined level.

FIG. 3 is an embodiment of example method 200 for determining whether there is a low salt condition. The embodiment of the example includes initiating infrared emission (operation 204), receiving infrared signal (operation 206), receiving brine tank size (operation 209), determining whether the salt depth is below a predetermined level (operation 210), alerting the user (operation 212) and reset (operation 214). Other embodiments of example method 200 can include more or fewer operations.

The embodiment of example method 200 begins with the infrared emitter emitting an infrared signal into the brine tank (operation 204). The computing device that is in communication with the infrared emitter initiates the infrared emission and starts a counter or records the time of emission. This time is used in later operation 210 to determine the time for the signal to be emitted and received at the infrared receiver. Operation 204 can be initiated based on a preset time, such as every about 1 hour, every about 2 hours, every about 4 hours, every about 8 hours, every about 12 hours, every about 18 hours, every about 24 hours, every about 36 hours, or every about 48 hours.

After the emission of the infrared signal, the signal is received by the infrared receiver in operation 206. Without being bound to a particular theory, the infrared signal reflects off the salt in the brine tank and the infrared receiver detects the reflected signal. The computing device records the time the signal was received. Alternatively, the computing device stops the timing that was initiated when the infrared signal was emitted. One or both of these values are stored and used during operation 210. In some instances, the reflected infrared signal will be too weak to detect. The lack of detection after an emission may also be stored and used during operation 210. Where there is a detected signal, the strength of that signal may also be stored and used during operation 210.

At some point during or before embodiment of method 200, the low salt detection system receives a brine tank size (operation 209). For example, the user indicates the brine tank size using a dip switch during installation of the low salt detection system. Other configurations for receiving a brine tank size are described above in more detail with reference to FIG. 2. The computing device stores the brine tank size and uses the brine tank size during salt level determination operation 210. That is, the system receives the brine tank size (operation 209) once. It will be appreciated, however, that the system can be installed on a different tank, at which point the user will indicate the new tank's size.

After the system has received the brine tank size (operation 209) and received the infrared signal (operation 206), the next operation in embodiment of method 200 is to determine whether the salt depth is below a predetermined level (operation 210). During this operation, the system calculates the time required for the infrared signal to be emitted and then received. For ease of discussion, this time is called the elapsed time. As discussed above, this calculation can include starting and stopping a timer or, alternatively, recording an emission time and a receipt time and subtracting the emission time from the receipt time to yield an elapsed time.

When the elapsed time is calculated, the system next determines whether the salt level is below a predetermined level. The predetermined level is a distance from the top of the brine tank to the top of the salt in the brine tank. The predetermined level can be factory pre-set or user-selected. The predetermined level is about 18 inches; about 20 inches; about 24 inches; about 28 inches; about 32 inches; about 34 inches; about 36 inches; or from about 20 inches to about 34 inches from the top of the brine tank.

Depending upon the predetermined level selected, a low salt level determination does not mean that more salt must be added immediately. Rather, the low salt level determination, again depending upon the level selected, is a warning that more salt needs to be added within the next approximately 15 to 30 days, assuming normal water use and normal softener regeneration cycles.

In embodiments, the computing device is configured to compare the elapsed time to a threshold time. The computing system can set a threshold time based on the brine tank size. For example, the system determines an elapsed time of about 2.4 nanoseconds in a 3-foot brine tank. In this example, the threshold for a low salt condition is about 2 nanoseconds, which corresponds to a salt height of about 24 inches from the top of the brine tank. Because the elapsed time (about 2.4 ns) is greater than the threshold (about 2 ns), the system determines that there is a low salt condition. Other thresholds are possible.

In embodiments, the computing device is configured to compare the elapsed time to a list of values correlating time to salt depth for the particular brine tank size. For example, in a 3.5 foot brine tank, an elapsed time of about 2 nanoseconds corresponds to a salt level depth of about 24 inches from the lid of the tank. The computing device then evaluates whether a salt level depth of 24 inches from the lid of the tank is less than the predetermined level.

In embodiments, the computing device is configured to calculate the salt depth using the elapsed time. For example, the system multiplies the known velocity of the infrared signal by the elapsed time to yield a distance, $d_1$, from the infrared components. The computing system also has the stored brine tank size, $d_2$, from operation 209. The salt depth can then be determined by subtracting $d_1$ from $d_2$. Other methods for determining the salt level are possible. The system can also record, track and save salt level history.

In embodiments, the computing device is configured to calculate the salt depth based on the strength or amplitude of the detected signal. The strength of the detected signal may be compared to a predetermined threshold or to the strength of the signal emitted in operation 204. The predetermined thresholds may be experimentally or analytically derived to correspond to particular levels of salt in a particular sized tank. Similarly, a ratio of the detected signal strength to the emitted signal strength would also indicate a particular salt level for a particular sized tank. The detected salt level is then compared to a predetermined salt level in operation 210 to determine if the current salt depth is below the predetermined level.

If a low salt condition is detected, the embodiment of method 200 proceeds to alert the user (operation 212). If the salt depth is not below the predetermined level, the embodiment of method 200 returns to initiate infrared emission (operation 204).

As discussed above with reference to FIG. 2, the embodiment of example low salt detection system can include one, or more than one, low salt alert components. In the embodiment of method 200, the system alerts the user when the system determines in operation 210 that there is a low salt condition. Operation 212 includes illuminating an LED, for example, by flashing the LED. Operation 212 also includes transmitting a low salt condition to the network server, which in turn sends one or more notification messages to the user.

Operation 212 can include alerting an electronic notification service by accessing the internet via a Wi-Fi network connection and sending the notification service a unique identifier. The system can be configured to transmit the low salt message or unique identifier daily.

Alerting user (operation 212) continues until either the user resets the system or salt is added to the brine tank and the system performs the next salt level determination (operation 214).

The embodiment of example low salt detection system 102 includes a "test" button. In some embodiments, the "test" button is displayed on an optional user interface or on a smart device. Other names of the button are possible. A result of pressing the "test" button is that the unit conducts a salt level check (operations 204, 206 and 210). If the result of the salt level check is that the salt level is no longer below the threshold level, the LED ceases flashing and the unit will not send another low salt message until it determines that there is a low salt condition. In other embodiments, a result of a user selecting the "test" button is that the unit verifies that it has a proper network connection. If no network connection is detected, or if a network connection is not functional, the user may be notified accordingly.

Figure 4:
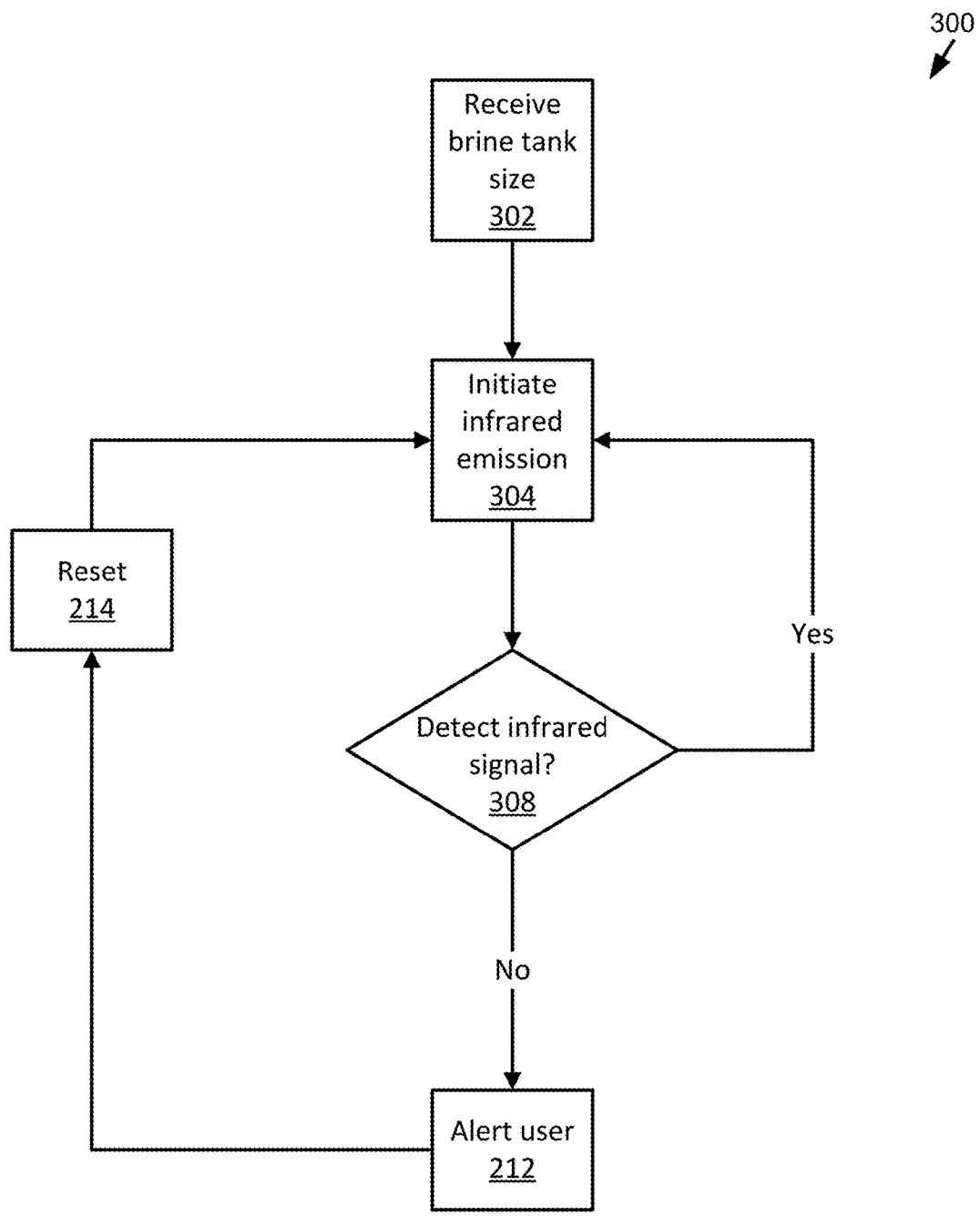
FIG. 4 is an embodiment of example method for determining whether there is a low salt condition.

FIG. 4 is an embodiment of example method 300 for determining whether there is a low salt condition. The embodiment of the example includes receiving brine tank size (operation 302), initiating infrared emission (operation 304), determining whether an infrared signal was detected (operation 308), alerting the user (operation 312) and reset (operation 214). Other embodiments of example method 300 can include more or fewer operations.

The embodiment of example method 300 begins with a low salt detection system 102 receiving a brine tank size (operation 302). Based on the brine tank size, the low salt detection system 102 adjusts the amount of current that is sent to the infrared emitter. An embodiment of an example configuration for adjusting the amount of current is shown and described below with reference to FIG. 8. The current is calibrated based on the power requirements of the infrared emitter, such as a near-infrared light emitting diode. The level of current sent to the LED is based on a predetermined low salt level, such that an emitted infrared signal is not detected by the infrared receiver when the signal travels a determined distance. Without being bound by a particular theory, if the infrared signal travel distance, from the emitter to the salt and back towards the infrared receiver, is greater than a threshold distance, the strength of the infrared signal will diminish to a point where the infrared receiver will not detect the signal.

Next, one or more than one infrared emissions are initiated (operation 304). For example, a series of eight pulses, at a frequency of between about 32 kHz and about 38 kHz, are emitted in operation 304. Other pulse frequencies may also be used depending on the embodiment and components utilized. Any number of pulses can be used, for instance, 1 pulse, 2 pulses, 3 pulses, 4 pulses, 5 pulses, 6 pulses, 7 pulses, 8 pulses, 9 pulses, 10 pulses, or more.

After each signal is emitted (operation 304), the system determines whether an infrared signal was detected by an infrared receiver (operation 308). In the example where eight pulses are emitted, the system determines that the brine tank has a low salt condition if less than eight infrared signals are detected by the infrared receiver. The system may also verify that the received frequency matches the emitted frequency.

For example, the infrared emitter sends out eight pulses and the infrared receiver detects five pulses. At that point, the system determines that there is a low salt condition because the system received less than all of the infrared signals emitted. In other embodiments, the system determines that the brine tank has a low salt condition using different thresholds for how many of the emitted infrared signals are detected by the infrared receiver. For example, the system determines that there is a low salt condition when five of eight pulses are received, but not when six of eight pulses are received. Other thresholds and numbers of pulses are possible.

If the system determines that there is not a low salt condition in operation 308, then the embodiment of example method 300 returns to operation 304 and the user is not alerted. In embodiments, the system can send a notification to the cloud server that the system does not have a low salt condition. It will be appreciated that the system can be configured to notify the user that there is not a low salt condition.

If the system determines that there is a low salt condition in operation 308, then the embodiment of example method 300 proceeds to alert the user (operation 212). Alerting the user (operation 212) is described in more detail above with reference to FIG. 3.

Alerting user (operation 212) continues until either the user resets the system or salt is added to the brine tank and the system performs the next salt level determination (operation 214). Reset (operation 214) is described in more detail above with reference to FIG. 3.

Figure 5:
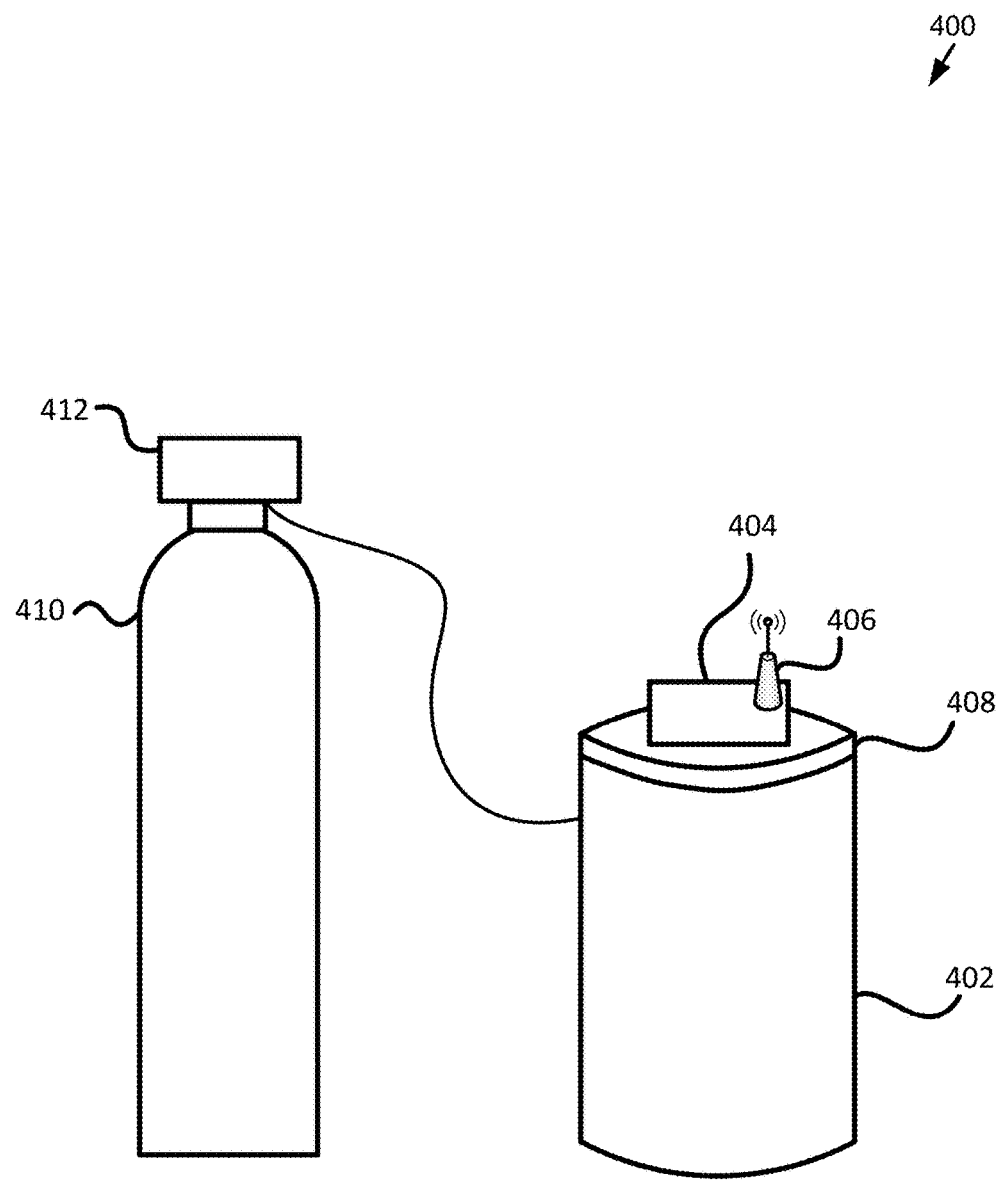
FIG. 5 is an illustration of a water softening system with an embodiment of an example low salt detection system.

FIG. 5 is an embodiment of an example water softening system 400. The embodiment 400 includes a brine tank 402, a low salt alert unit 404, wireless communication unit 406, brine tank lid 408, control valve 412 and mineral tank 410. Other embodiments can include more or fewer components.

The brine tank 402 is shown as a cylindrical brine tank, which is commonly made of a plastic material. However, the low salt alert unit 404 can be used for a brine tank with any cross-sectional shape, such as rectangular, square, triangular, pentagonal, etc. Additionally, as discussed above, the low salt alert unit 404 can be used with brine tanks 402 of different sizes and materials.

In embodiments, the low salt alert unit 404 is installed as a retrofit. That is, the unit 404 is installed after factory production, for example, by a water softener dealer, a home user, etc. An example of a configuration for a retrofitted low salt alert unit 404 is shown and described in more detail below with reference to FIG. 6. The low salt alert unit 404 includes the components of low salt detection system 102 described above in more detail with reference to FIG. 2.

Figure 6:
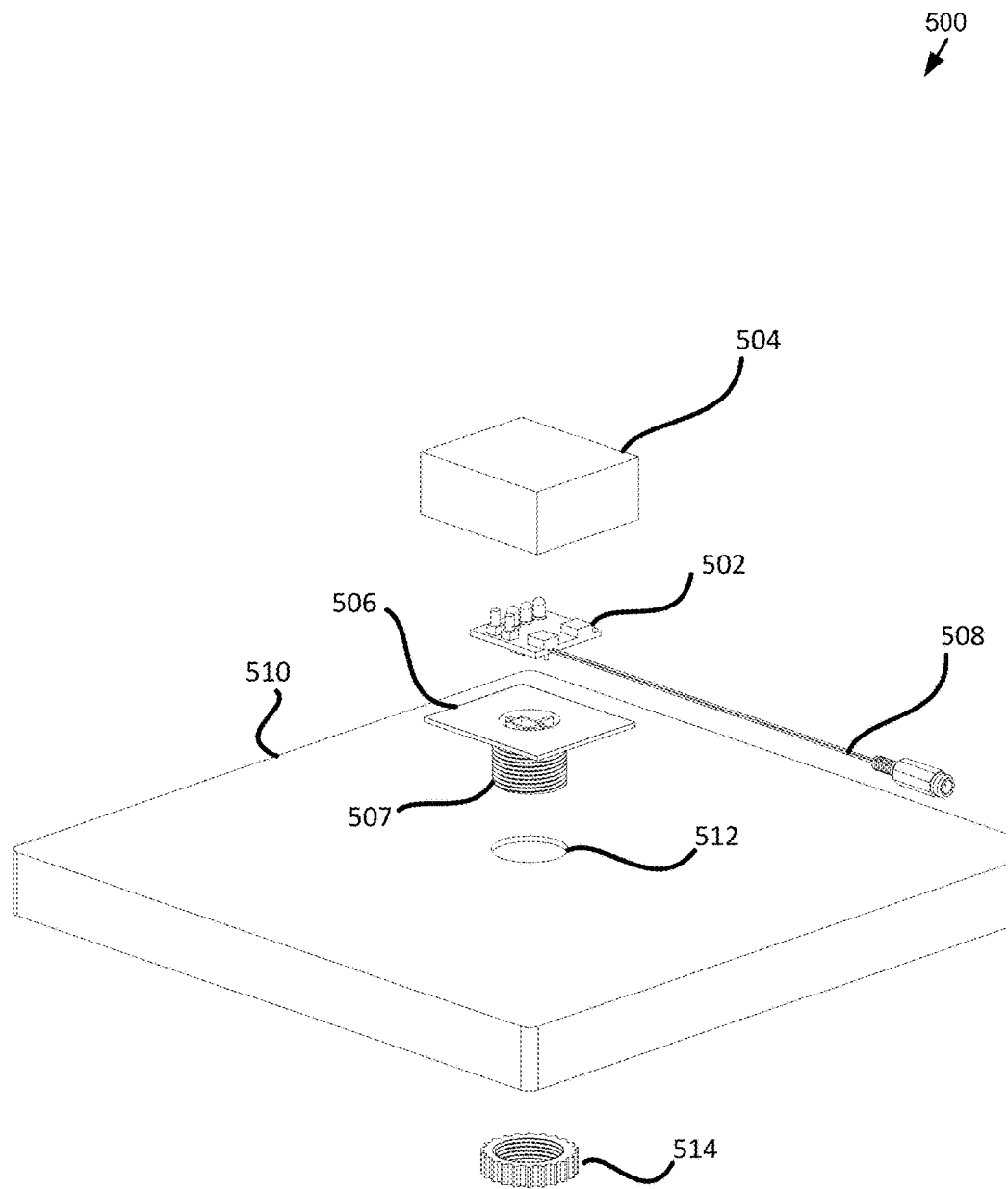
FIG. 6 is an isometric, exploded view of an embodiment of an example low salt detection unit.

As depicted in FIGS. 5 and 6, the low salt alert unit 404 is positioned at or near the centroid of the brine tank lid 408. Additionally, in the embodiment of example water softening system 400, the infrared emitter is positioned such that the infrared signal does not pass through the lid of the tank 408 before entering the tank space and reflecting off of the salt. The low salt alert unit 404 is also configured with the infrared receiver positioned to receive infrared signals without the signals first passing through the sides of the tank or the lid of the tank 408.

The low salt alert unit 404 can include a reset button. In embodiments, the reset button is recessed and will require a paper clip or similarly sized object to access. When pressed, the reset button can cause the Wi-Fi module to reset by, for example, cycling the power to a circuit board or the Wi-Fi module. When pressed for more than a specific period of time, for example, two seconds, the reset button can cause the reset of the computing device which erases the Wi-Fi network configurations and brine tank size.

The wireless communication unit 406 includes wireless communication components for connecting to a Wi-Fi network. For example, the wireless communication unit 406 includes a Wi-Fi system on a chip (SoC), radio-frequency communication components, and an on-board antenna. An example wireless communication unit 406 is a CC3200 made by Texas Instruments (Dallas, Tex.).

The wireless communication unit 406 can alternatively, or additionally, include components compatible with one or more of the following communication protocols: ANT+, Bluetooth Low Energy (BLE), Zigbee, Near-Field Communication (NFC), WiFi Direct, and 6LoWPAN.

In the embodiment shown, the control valve 412 and mineral tank 410 are not in communication with the low salt alert unit 404. Thus, the low salt alert unit 404 does not control the operation of the control valve 412. In alternate embodiments, the control circuitry for the low salt alert unit 404 is incorporated into the valve, and the regeneration cycle can be stopped when there is a low salt condition.

FIG. 6 is an exploded view of an embodiment of an example environment 500 showing a low salt alert unit configured to be secured to a brine tank lid. The embodiment includes a low salt alert unit including: a circuit board 502, a circuit board housing lid 504, a circuit board housing base 506, a power source 508, and a compression nut 514. Also shown are a brine tank lid 510 and a cutout 512. Other embodiments can include more or fewer components.

The illustrated circuit board 502 includes LED indicators for power, wireless connectivity and low salt condition. The illustrated circuit board 502 also includes mounted switches for resetting a wireless configuration, cycling the low salt system to determine whether a low salt condition still exists, indicating a brine tank size, and/or sending a test message. Additionally, the circuit board 502 supports the infrared emitter and infrared receiver, which are directed towards the brine tank interior.

The circuit board 502 is also configured to receive power from a power source 508. As illustrated, power source is a 4.5 volt DC overmolded barrel jack. Other power sources are possible, such as 5 volt DC, 12 volt DC, and all voltages therebetween. The DC connection can receive power from building mains or from a control valve/mineral tank assembly.

The infrared emitter is aligned on the circuit board 502 such that the infrared signal is emitted normal or substantially normal to the plane of the brine tank lid, which is generally parallel to the surface supporting the brine tank. The infrared receiver is aligned on the circuit board 502 such that the receiving sensor plane is parallel or substantially parallel to the plane of the brine tank lid.

The illustrated circuit board housing lid 504 is an optional component that is sized to fit over the circuit board 502. Additionally, the circuit board housing lid 504 is at least minimally transparent such that the light from the LEDs can be seen while the lid 504 is in place.

The circuit board housing base 506 includes a surface which supports the circuit board 502 and a cylindrical portion 507 that is sized to pass through a cutout 512 in the brine tank lid 510. The circuit board housing base 506 also includes support guides for the infrared emitter and infrared receiver that project downward from the circuit board 502. These guides are optional.

As illustrated, the circuit board housing lid 504 is substantially a rectangular prism and the circuit board housing base 506 is substantially rectangular. Other shapes are possible, such as a cylinder shape for the housing lid 504 and a circular shape for the housing base.

As illustrated, the cylindrical portion 507 sized to pass through the cutout 512 is threaded such that a compression nut 514 can be used to secure the circuit board housing base 506 to the brine tank lid 510. The cylindrical portion 507 can be other shapes as well. In other embodiments, the portion 507 is not threaded and the circuit board housing base 506 is adhered or fastened to the brine tank lid.

The brine tank lid 510, as illustrated, has a square cross-sectional shape. However, the low salt alert system unit can be secured to a brine tank lid with any cross-sectional shape. The cutout 512 in the brine tank lid 510 can be made during or after the lid is manufactured. As illustrated, the cutout 512 is substantially circular and sized to allow the cylindrical portion 507 to pass therethrough. The diameter for the cutout 512 is about 0.5 inch; about 1.0 inch; about 1.25 inches; about 1.45 inches; about 1.5 inches; about 2.0 inches; about 2.5 inches; about 3.0 inches; about 3.5 inches; or about 4.0 inches.

Figure 7:
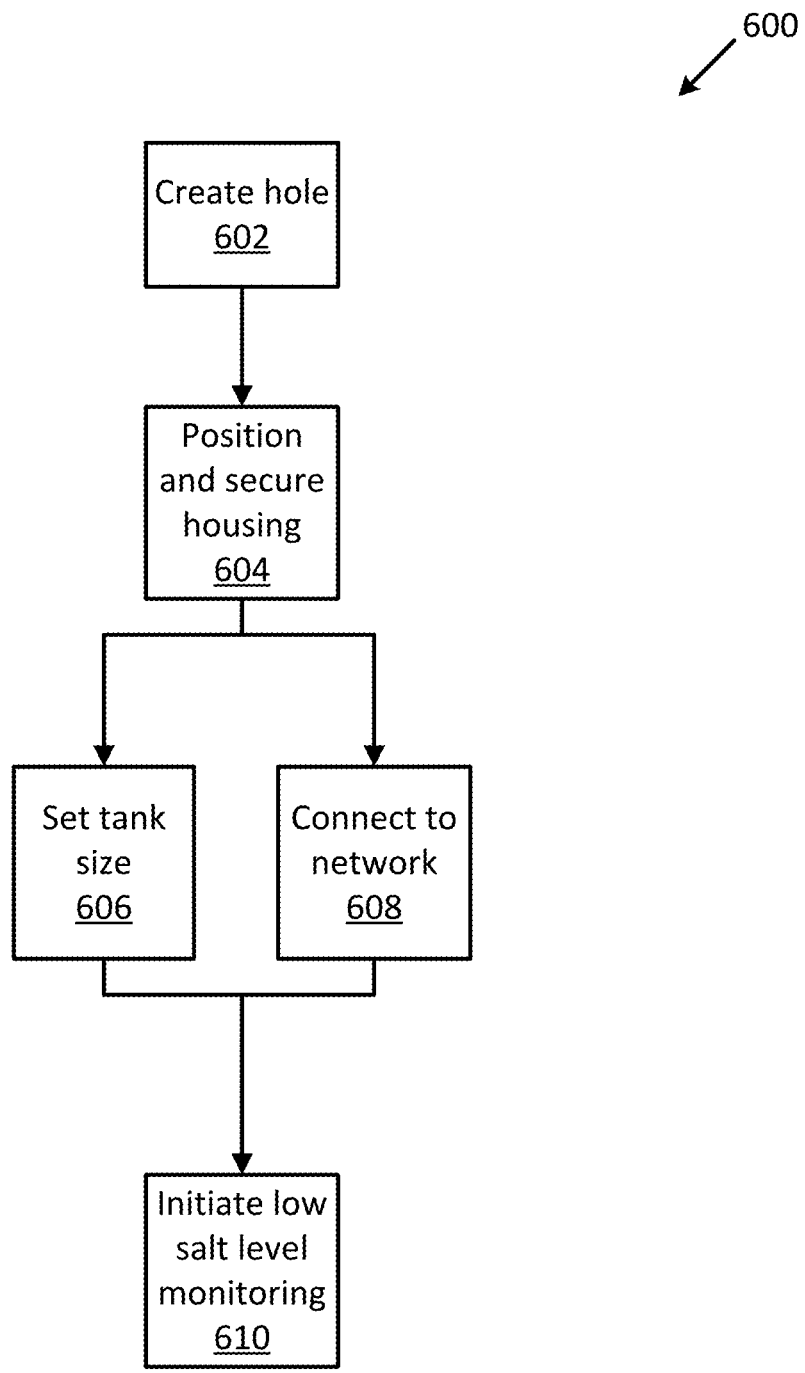
FIG. 7 is an embodiment of an example method for installing a low salt detection unit.

FIG. 7 is an embodiment of an example method 600 for installing a low salt detection unit. The embodiment of the example method 600 includes creating a hole (operation 602), positioning and securing housing (operation 604), setting a tank size (operation 606), connecting to a wireless network (operation 608), and initiating salt level detection (operation 610). The illustrated method is for a user installing a low salt detection system on a post-production brine tank. However, it will be appreciated that the method can be performed during manufacturing or prior to being sold to an end user. Other embodiments can include more or fewer operations.

The embodiment of example method begins by creating a hole in the brine tank lid (operation 602). The size and shape of the hole in the brine tank should allow for a protruding portion of the circuit board housing to pass through the lid.

After a hole has been created in the brine tank lid (operation 602), the housing is positioned and secured to the lid (operation 604). In the embodiment shown in FIG. 6, the protruding portion of the circuit board housing is a threaded cylinder. In this embodiment, the compression nut is used to secure the circuit board housing. In other embodiments, the circuit board housing is secured to the brine tank lid using an adhesive or one or more fasteners.

Next, the user sets the brine tank size (operation 606). The low salt alert unit includes a dip switch or a slide switch with different brine tank sizes labeled. The user chooses the size corresponding to the brine tank dimensions. In other embodiments, the user indicates the brine tank size using a graphical user interface that is part of the low salt detection unit and/or via a smart apparatus, such as a computer, smart phone, tablet computer, smart watch, etc.

After operation 604, the user also connects the low salt alert unit to a wireless network (operation 608). In an embodiment, the wireless network is a Wi-Fi network. The user configures the low salt alert unit with information including a network SSID, a gateway IP address and a password if the network is secured. Commercial protocols that can accomplish this include Wi-Fi Direct, User Datagram Profile, and Texas Instrument's SmartConfig. In this embodiment, the user accesses an application running on a smart phone, tablet computer, computer or the like, and connects to the Wi-Fi-enabled low salt alert unit and configures the unit with the required network information. In some instances, the same application is used to configure other low salt alert unit information, such as the device name and the internet data server, a service provider, to communicate with. When the low salt alert unit is connected to the wireless network, a notification LED is illuminated.

Operation 608 can additionally include the user accessing a cloud server, for example through the internet. There, the user can create an account, register him or herself, the device, enter contact information including phone number and email, and/or select how to receive messages. For example, the user can select to receive either a text message alert, an email alert, or both. The user can also indicate the date of purchase, the frequency of notification alerts, and physical address.

Next, the user initiates low salt level monitoring (operation 610). An example method for low salt level monitoring is shown and described in more detail above with reference to FIG. 3.

Figure 8:
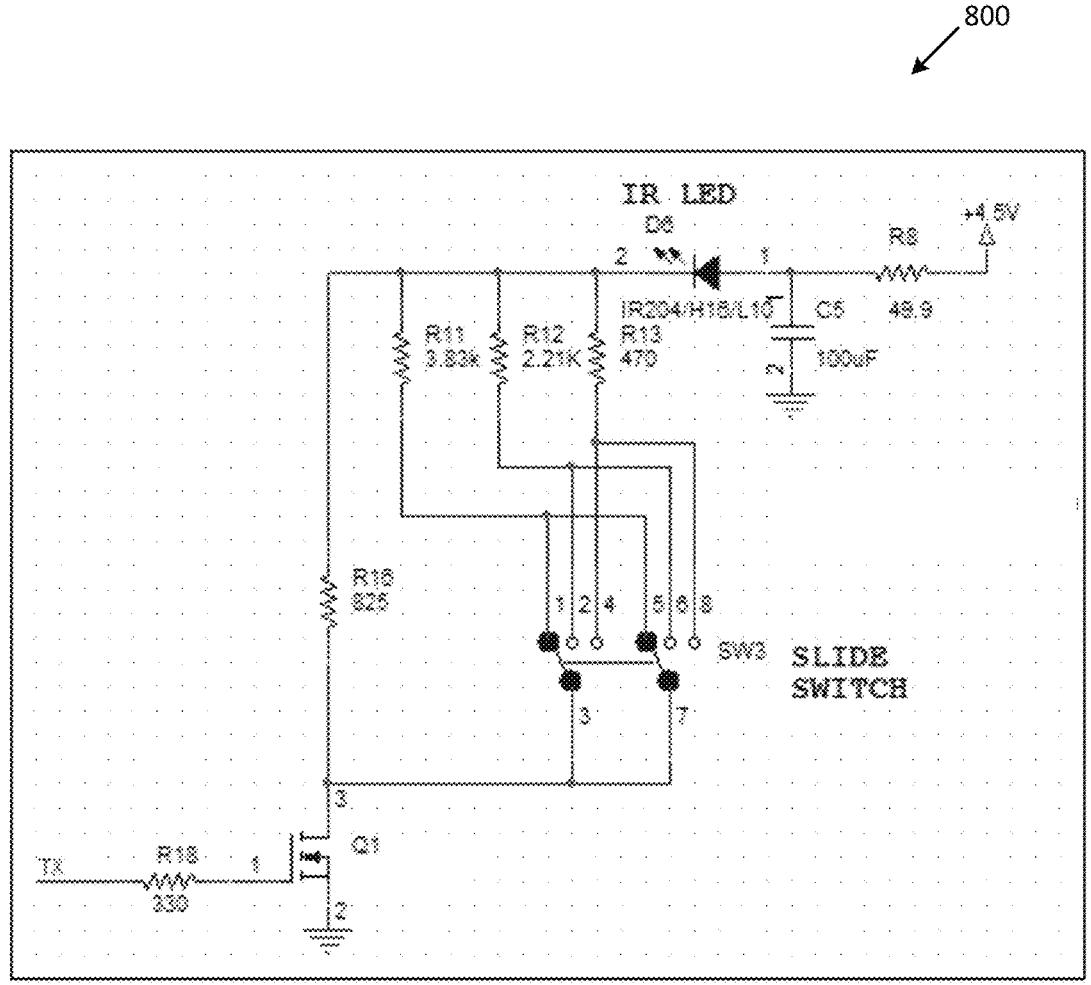
FIG. 8 is a circuit diagram of an embodiment of an example low salt detection unit.

FIG. 8 is a circuit diagram of an embodiment of an example circuit 800 used in a low salt alert system. The circuit diagram shows resistors R8 and the parallel combination of R16 and one of R11, R12 or R13, an infrared LED D6, field-effect transistor Q1, and slide switch SW3, among other components. Other embodiments can include more or fewer components. Other values for the components shown in FIG. 8 are possible.

In the embodiment shown, the resistances of R8, R11, R12, R13 and R16 are 49.9 Ω, 3.83 kΩ, 2.21 kΩ, and 470Ω, respectively. Other resistances are possible. The amount of current through the infrared LED is determined, in part, by R8 and the parallel combination of R16 and one of R11, R12, or R13.

As shown, the slide switch SW3 is in a position such that current flows across R8, R11 and R16 determine the current through the infrared LED. By moving the position of the slide switch, the amount of current flowing across the infrared LED D6 can be changed or controlled. For example, by moving the switch such that the contacts are on points 2 and 6 rather than 1 and 5, current flows across R12 rather than R11. Because R12 and R11 have different resistances, the current drawn across the infrared LED D6 is different. By causing a higher level of current to flow across the infrared LED D6, a higher strength infrared light signal is emitted from the LED D6. As discussed above, the user indicates the brine tank size using the slide switch SW3.

The circuit is supplied from a 4.5 V power source. As mentioned above, other voltages for the power source are possible, such as voltages from about 4.5 V to about 12 V. Different amounts of supplied voltage are possible depending on the selected components. Q1 is a field-effect transistor. Activating the transistor Q1 closes the circuit and allows current to flow across the infrared LED D6, thus generating light. The light can be modulated by modulating the voltage on the gate of the transistor Q1. For instance, to provide pulsed light, pulsed voltage can be applied to the gate of the transistor Q1 causing a pulsed current to flow across the infrared LED D6. The pulsed voltage on the gate of the transistor Q1 may come from any suitable source for producing modulated signals from the location depicted as TX in FIG. 8. For example, a microprocessor generates a modulated signal that is sent to the gate of the transistor Q1 via a serial I/O pin. The pulses from the microprocessor may represent a particular character or string of characters, such that when the pulses are eventually detected the emitted character may be compared to the detected character.

In alternate embodiments, the low salt alert system can determine that the salt level in the brine tank is within one or more ranges. In those embodiments, the system select from R11, R12, R13, or any additional resistors without user intervention. The system first selects the highest overall resistance and therefore emits an infrared signal with the lowest strength. As long as the system receives one or more reflected signals at that resistance, the system determines that the salt level is in a range, for example, less than about 20 inches from the lid of the brine tank.

When the system no longer receives a signal at that resistance, a controller selects a lower overall resistance, resulting in a higher strength infrared signal being emitted. Each overall resistance level corresponds to a particular level of salt for a particular size brine tank. The process repeats and the system determines that the salt level is in a predetermined range, for example, less than about 20 to about 34 inches from the lid of the brine tank, as long as the one or more reflected infrared signals are detected. This process continues for selecting any additional lower overall resistances. It will be appreciated that more resistors can be used in other embodiments, which would narrow the indicated salt level ranges.

In embodiments, a variable resistor is used in place of resistors R11-13 and/or R16 and the slide switch SW3. The resistance is selected using an input/output pin on a microprocessor, which automates the resistance selection process. A manual potentiometer or a digital potentiometer can be used.

As shown in FIG. 8, transistor Q1 may be a BSS138 N-Channel Logic Level Enhancement Mode Field Effect Transistor commercially available form Fairchild Semiconductor. As also depicted, infrared LED may be an IR204/H16/L10 commercially available from Everlight. Other similar components could be utilized in place of these example components.

Figure 9:
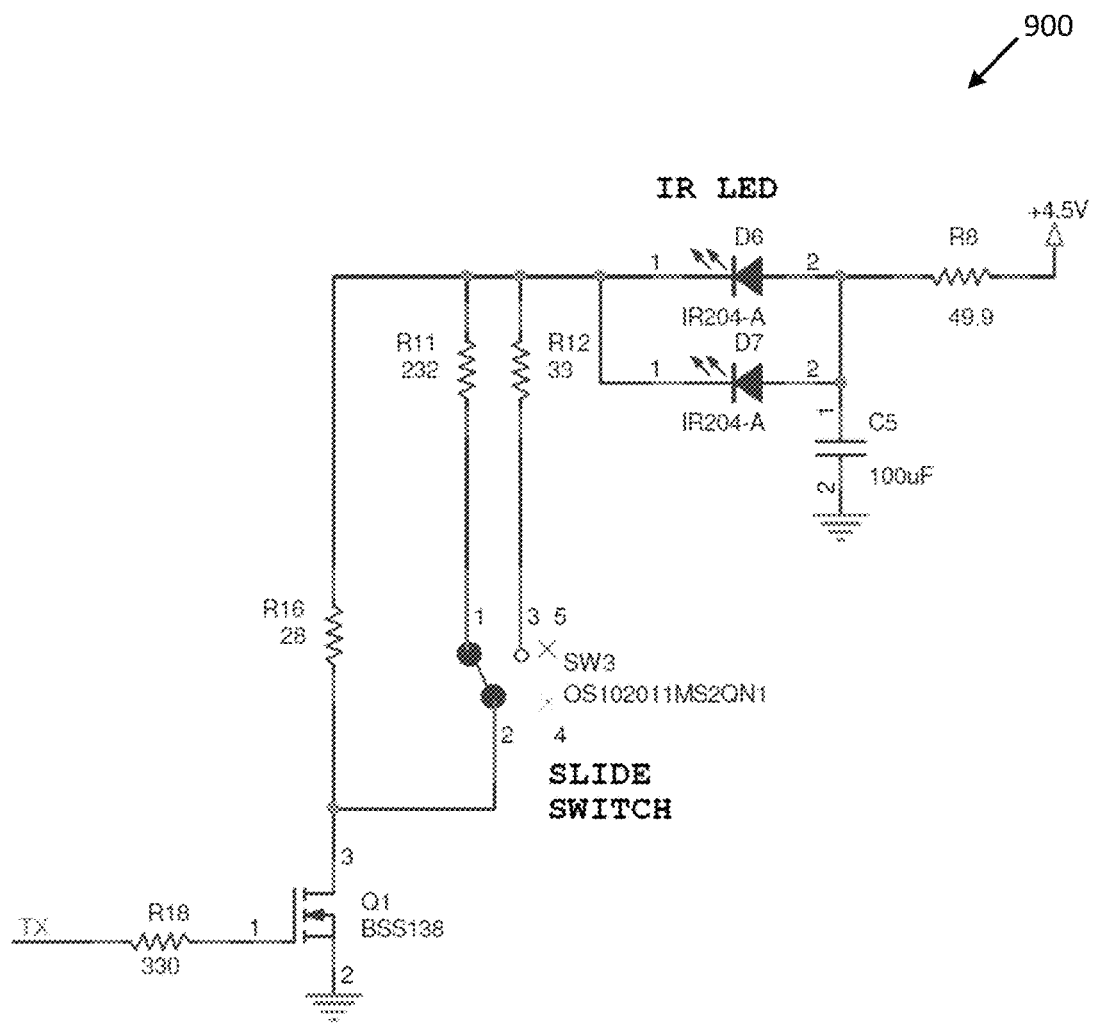
FIG. 9 is a circuit diagram of a second embodiment of an example low salt detection unit.

FIG. 9 is a circuit diagram of a second embodiment of an example circuit 900 used in a low salt alert system. The circuit diagram shows resistors R8 and the parallel combination of R16 and one of R11 or R12, infrared LEDs D6 and D7, field-effect transistor Q1, and slide switch SW3, among other components. Other embodiments can include more or fewer components. Other values for the components shown in FIG. 9 are possible.

The embodiment of example circuit 900 includes two infrared LEDs, D6 and D7. In other embodiments, one infrared LED is used, such as in the embodiment shown in FIG. 8.

Also, the embodiment of example circuit 900 includes slide switch SW3 that may be used to select one of two resistors, R11 or R12. In other embodiments, a single resistor is used in parallel with R16 and those embodiments do not include slide switch. In yet other embodiments, the slide switch may be used to select four or more different resistors.

The block diagrams depicted herein are just examples. There may be many variations to these diagrams described therein without departing from the spirit of the disclosure. For instance, components may be added, deleted or modified.

As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussions regarding ranges and numerical data. Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 4 percent to about 7 percent" should be interpreted to include not only the explicitly recited values of about 4 percent to about 7 percent, but also include individual values and sub-ranges within the indicated range. Thus, included in this numerical range are individual values such as 4.5, 5.25 and 6 and sub-ranges such as from 4-5, from 5-7, and from 5.5-6.5; etc. This same principle applies to ranges reciting only one numerical value. Furthermore, such an interpretation should apply regardless of the breadth of the range or the characteristics being described.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

What is claimed is:

1. A brine tank low salt level detection apparatus, comprising:
    an infrared emitter;
    an infrared sensor;
    a housing supporting the infrared emitter and the infrared sensor;
    at least one processor, wherein the at least one processor is in communication with the infrared emitter and the infrared sensor; and
    a memory device in communication with the processor, wherein the memory device stores instructions that, when executed by the processor, cause the apparatus to:
        receive an indication of a brine tank size;
        adjust a power supplied to the infrared emitter based on the brine tank size;
        emit an infrared signal;
        detect a reflected infrared signal; and
        determine whether a salt level in a brine tank is below a predetermined level based at least in part on the detection of the reflected infrared signal.

2. The brine tank salt level detection apparatus of claim 1, wherein the infrared emitter is an infrared light emitting diode, and
    wherein the memory device further comprises instructions that, when executed by the processor, cause the infrared light emitting diode to emit the infrared signal at a predetermined time.

3. The brine tank salt level detection apparatus of claim 2, wherein the housing is configured to be secured to a lid of the brine tank; and
    wherein the housing further comprises a mounting cylinder and a nut configured to secure the apparatus to the lid of the brine tank.

4. The brine tank salt level detection apparatus of claim 2, further comprising:
    a wireless communication module in electrical communication with the processor and the memory device, wherein the wireless communication module is configured to transmit a low salt level alert received from the processor; and
    wherein a longitudinal axis of the infrared emitter is aligned substantially normal to a lid of the brine tank.

5. The brine tank salt level detection apparatus of claim 4, further comprising a notification LED configured to be illuminated when the processor determines that the salt level is below the predetermined level.

6. The brine tank salt level detection apparatus of claim 5, wherein the predetermined level is about 20 to 36 inches from the lid of the brine tank.

7. The brine tank salt level detection apparatus of claim 5, wherein the processor determines a low salt level condition in the brine tank at least in part based on whether the infrared sensor detected one or more reflected infrared signals.

8. A method for determining a salt level in a brine tank, comprising:
    receiving an indication of a brine tank size;
    wherein an infrared emitter emits an outgoing infrared signal, adjusting a power supplied to the infrared emitter based on the brine tank size;
    emitting the outgoing infrared signal;
    receiving an incoming infrared signal;
    determining whether the salt level is below a predetermined level based at least in part on the receipt of the incoming infrared signal; and
    when the salt level is below a predetermined level, alerting a user of a low salt level in the brine tank.

9. The method for determining a salt level in a brine tank of claim 8, further comprising:
    illuminating a notification light emitting diode when the salt level is below the predetermined level,
    wherein the incoming infrared signal is a reflection from salt in the brine tank.

10. The method for determining a salt level in a brine tank of claim 8, wherein determining whether the salt level is below the predetermined level includes determining whether an infrared sensor detected at least a predetermined number of incoming infrared signals.

11. The method for determining a salt level in a brine tank of claim 10, wherein alerting includes transmitting a message via a wireless network.

12. The method for determining a salt level in a brine tank of claim 11, wherein the outgoing infrared signal is emitted about every 24 hours; and
    wherein the message is transmitted about every 24 hours.

13. The method for determining a salt level in a brine tank of claim 11, wherein alerting further comprises illuminating a notification light emitting diode when the salt level is below the predetermined level; and
    wherein the outgoing infrared signal is emitted by an infrared light emitting diode with a longitudinal axis oriented substantially normal to a lid of the brine tank.

14. A system for notifying a user of a low salt level in a brine tank, comprising:
    an infrared light emitting diode;
    an infrared sensor;
    a visible light emitting diode;
    a computing device in communication with the infrared light emitting diode, the visible light emitting diode and the infrared sensor, wherein the computing device comprises a processor, a memory and a wireless module; and
    a housing supporting the infrared light emitting diode, the infrared sensor, the visible light emitting diode and the computing device,
    wherein the memory stores instructions that, when executed by the processor, cause the system to:
        receive an indication of a brine tank size;
        adjust a power supplied to the infrared light emitting diode based on the brine tank size;
        periodically emit an infrared signal into the brine tank;
        detect a reflected infrared signal;

determine whether a salt level in the brine tank is below a predetermined level based at least in part on the receipt of the reflected infrared signal;

transmit a low salt level alert via the wireless module when the salt level in the brine tank is below the predetermined level; and illuminate the visible light emitting diode when the salt level in the brine tank is below the predetermined level.

15. The system for notifying a user of a low salt level in a brine tank of claim 14, wherein the low salt level alert is sent to a cloud server; and wherein the low salt level alert is sent when the salt level is more than about 20 inches from the top of the brine tank.

16. The system for notifying a user of a low salt level in a brine tank of claim 15, wherein a portion of the housing is sized to pass through a circular cutout in a brine tank lid, the circular cutout being about 2.5 inch in diameter; and wherein the low salt level alert is sent when the salt level is more than about 34 inches from the top of the brine tank.

17. The system for notifying a user of a low salt level in a brine tank of claim 16, further comprising a brine tank size indicator, wherein the processor uses the indication of the brine tank size from the brine tank size indicator to determine whether the salt level in the brine tank is below the predetermined level.

18. The system for notifying a user of a low salt level in a brine tank of claim 14, wherein the memory further stores instructions that, when executed by the processor, cause the system to determine the height of the salt in the brine tank.

19. The system for notifying a user of a low salt level in a brine tank of claim 18, wherein the infrared signal is emitted about every 24 hours;

wherein the infrared light emitting diode is positioned normal to a base of the brine tank;

wherein the visible light emitting diode is configured to flash when the salt level is below the predetermined level; and wherein the processor determines the salt level in the brine tank at least in part based on whether the infrared sensor detected one or more reflected infrared signals.

* * * * *